United States Patent [19]

Melinat

[11] 4,373,615
[45] Feb. 15, 1983

[54] LAMINATED DISC BRAKE PAD ASSEMBLY

[75] Inventor: Wolfgang Melinat, Dayton, Ohio

[73] Assignee: General Motors Corporation, Detroit, Mich.

[21] Appl. No.: 228,707

[22] Filed: Jan. 26, 1981

[51] Int. Cl.³ .................... F16D 65/02; F16D 69/02; F16D 69/04

[52] U.S. Cl. .................. 188/73.1; 188/73.37; 188/250 B

[58] Field of Search ........... 188/73.1, 250 D, 250 E, 188/250 F, 250 G, 256, 258, 73.35, 264 G, 205 A, 206 R, 73.37, 250 B; 192/107 C, 109 R, 109 B, 30 V

[56] References Cited

U.S. PATENT DOCUMENTS

| | | | |
|---|---|---|---|
| 2,904,138 | 9/1959 | Wilson | 188/251 R |
| 3,490,563 | 1/1970 | Hahm | 188/264 G |
| 3,503,475 | 3/1970 | Mione | 188/264 G |
| 3,885,651 | 5/1975 | Odier | 188/264 G |
| 3,918,555 | 11/1975 | Rath | 188/250 R |
| 3,966,026 | 6/1976 | Filderman | 188/73.1 |
| 4,022,302 | 5/1977 | Janssen | 188/73.1 |
| 4,064,975 | 12/1977 | Filderman | 188/73.1 |
| 4,103,761 | 8/1978 | Filderman | 188/250 E |
| 4,230,207 | 10/1980 | Stahl | 188/73.1 |
| 4,240,530 | 12/1980 | Tillenburg | 188/250 E |

*Primary Examiner*—Douglas C. Butler
*Assistant Examiner*—R. R. Diefendorf
*Attorney, Agent, or Firm*—D. D. McGraw

[57] ABSTRACT

A semi-metallic lining is attached to one side of a disc brake shoe. A ceramic heat barrier is attached to the other side of the shoe. A rubber compound is attached to the heat barrier on the side opposite the shoe and a second shoe is attached to the rubber compound. An additional rubber compound is on the opposite side of the second shoe. The caliper piston rests on the additional rubber compound. The rubber compounds have high energy absorbing, vibration damping characteristics. They are heat resistant, ozone resistant, brake fluid resistant, oil resistant, must have low displacement and must be firm. Shoe mounting pins fit loosely through holes in the first shoe and heat barrier and tightly through holes in the second shoe. The loose fit through the first shoe eliminates a possible noise path from the lining through the first shoe and the pins into the caliper. The pins retain the entire shoe and lining assembly within the caliper.

2 Claims, 2 Drawing Figures

LAMINATED DISC BRAKE PAD ASSEMBLY

The invention relates to a disc brake pad assembly having laminations which suppress brake noise and inhibit the transmission of heat from the brake lining to the actuating fluid.

The assembly embodying the invention is particularly useful when semi-metallic linings are used in a disc brake assembly. Such linings tend to be more noisy during brake operation than organic linings. They also tend to transmit more heat toward the hydraulic brake fluid than do organic linings. However, the invention is also useful when using various suitable lining materials, including organic linings.

The assembly is made of several laminations including a heat barrier lamination and vibration damping laminations. The heat barrier lamination is preferably made of a suitable ceramic attached to a brake shoe lamination made of metal plate, with the friction lining pad on the other side of the metal plate from the heat barrier. Suitable adhesives may be used for such attachment. A lamination made of a rubber or rubber-like compound is attached to the other side of the heat barrier and also to a second metal plate brake shoe lamination. In some instances it is also desirable to provide another rubber compound lamination on the outside of the second metal plate so as to be operatively engageable by the caliper piston. The rubber compound lamination or laminations must have energy absorbing, vibration damping characteristics. They are preferably heat resistant, ozone resistant, brake fluid resistant, oil resistant, have a low displacement characteristic, and firm.

It is a feature of the invention that the brake pad assemblies are provided with suitable openings through the laminations through which brake pad mounting pins are fitted and secured to the caliper housing. More particularly, the openings through the first metal plate lamination to which the friction lining is attached and through the ceramic heat barrier lamination are sufficiently larger than the diameter of the shoe mounting pins to prevent contact of these laminations with the shoe mounting pins. The openings through the other laminations are more closely fitted so as to minimize brake pad assembly lamination movements in the planes of these laminations. The loose fit through the first shoe and the ceramic heat barrier eliminates a possible noise path from the friction lining through the first metal plate shoe and the pins into the caliper.

IN THE DRAWING

Figure 1:
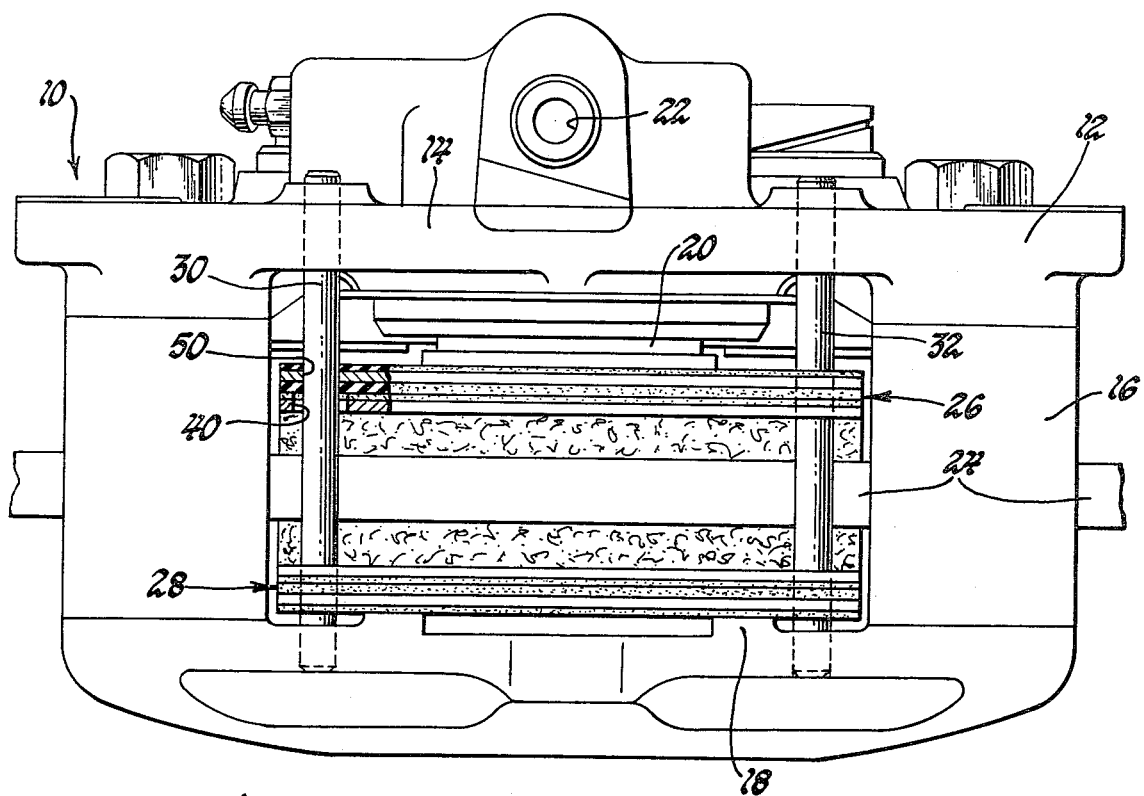
FIG. 1 is a plan view of a disc brake caliper assembly having disc brake pad assemblies embodying the invention installed therein, parts being broken away and in section.

The caliper assembly 10 is illustrated as being of the single piston sliding caliper type. It includes a caliper housing 12 defined by an inner leg 14, a bridge 16 and an outer leg 18. A piston 20 is suitably mounted in a cylinder formed in leg 14. Hydraulic brake actuating fluid is introduced into the chamber behind piston 20 through a suitable port 22. The caliper is fitted over a disc 24 suitably attached to a wheel to be braked. The caliper is provided with an inner disc brake pad assembly 26 and an outer disc brake pad assembly 28. The outer pad assembly 28 is engaged by suitable portions of the outer leg 18 while the inner pad assembly 26 is operatively engaged by one end of piston 20. The pad assemblies are slidably mounted on mounting pins 30 and 32 which are suitably secured to the caliper housing 12 for this purpose. While disc brake pad assembly 26 is of the type embodying the invention, disc pad assembly 28 may or may not have all of the features of the invention.

Figure 2:
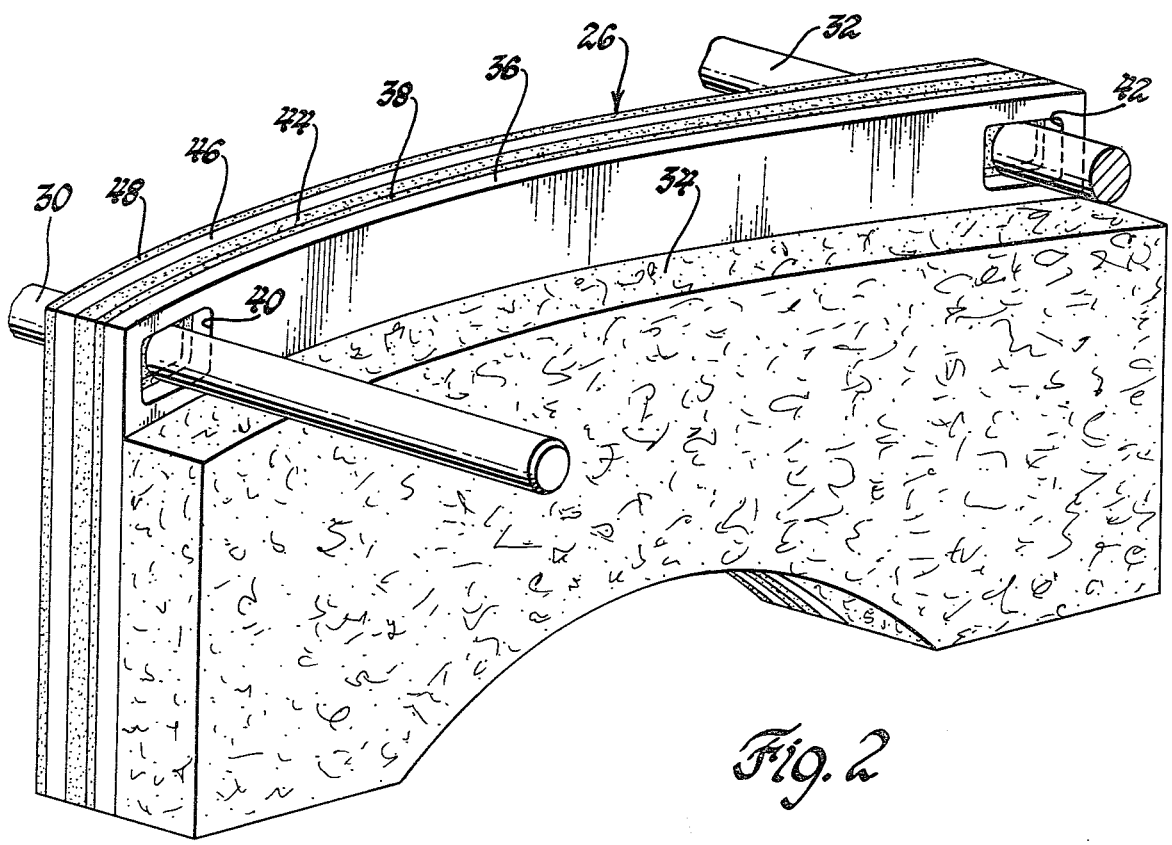
FIG. 2 is a perspective view of the inboard disc brake pad assembly of FIG. 1, with parts broken away and in section.

Disc brake pad assembly 26 is shown in greater detail in FIG. 2. It is made in several laminations which will now be described in order beginning with the friction lining pad 34. Lining pad 34 may particularly be of the semi-metallic type well known in the art. The lamination to which lining pad 34 is secured is defined by a first metal plate brake shoe 36. On the other side of shoe 36 from lining pad 34 a lamination 38 of a suitable material providing a heat barrier is adhesively attached to shoe 36. Lamination 38 is preferably made of a suitable ceramic material having excellent heat barrier characteristics. Enlarged openings 40 and 42 are provided through laminations 36 and 38 so that the shoe mounting pins 30 and 32 may be respectively received therethrough in spaced relation. Openings 40 and 42 are sufficiently larger than the diameters of pins 30 and 32 to permit limited lateral or planar movements of laminations 36 and 38 relative to the mounting pins without having any physical contact of these laminations with the mounting pins. This movement is accommodated by lamination 44, which is made of a suitable rubber or rubber-like compound and is secured to the side of lamination 38 opposite lamination 36. Lamination 44 may be made of a polymer, for example. Whatever the specific compound used, it must have high energy absorbing and vibration damping characteristics. The material should be heat resistant, ozone resistant, hydraulic brake fluid resistant, oil resistant, have a low displacement, and be firm.

Another lamination 46 is made of a second metal plate brake shoe which is secured to lamination 44 on the opposite side thereof from lamination 38. Thus there are essentially two metal plate brake shoes operatively joined together through a vibration absorbing rubber compound lamination. Another lamination 48 may be provided on the outside of lamination 46 opposite lamination 44, particularly when the shoe assembly is used on the inner side and operatively engageable by the piston 20. It is desirable that the compound from which lamination 48 is formed have similar characteristic to the compound from which lamination 44 is formed.

The openings provided through laminations 44, 46 and 48 through which pins 30 and 32 are received provide for a tight but sliding fit of these laminations about the pins. One such opening 50 in illustrated in a broken away section in FIG. 1.

The brake shoe pad assembly 26 embodying the invention functions extremely well as a brake lining noise suppression system by allowing lining 34, brake shoe 36 and heat barrier 38 to vibrate in any planar direction relative to the brake shoe lamination 46 and laminations 44 and 48, which are retained by the mounting pins 30 and 32. Thus laminations 46 and 48, and to some extent lamination 44, are held substantially stationary without such vibration. The shoe assembly is an elastic lining noise damper which damps lateral and longitudinal lining noises. It prevents lining noise from entering the caliper housing and progressing through the caliper and the vehicle suspension so as to be objectionably present insofar as the vehicle occupants are concerned.

The embodiments of the invention in which an exclusive property or privilege is claimed are defined as follows:

1. A disc brake pad assembly providing brake noise suppression and a heat barrier, said assembly comprising layers as follows:
   a brake friction lining pad,
   a first metal plate brake shoe to one side of which said pad is attached,
   a ceramic heat barrier having one side attached to the other side of said first brake shoe,
   a first rubber-like compound attached to the other side of said ceramic heat barrier,
   a second metal plate brake shoe to one side of which said first rubber-like compound is attached,
   and a second rubber-like compound attached to the other side of said second brake shoe and adapted to be engaged by a suitable brake force applying mechanism such as a piston or caliper leg,
   said rubber-like compounds being firm, with low displacement under compressive forces and resistant to heat, ozone, hydraulic brake fluid and oil;
   said first brake shoe having openings therein adapted to receive shoe mounting pins therethrough in spaced relation, and openings, aligned with said first brake shoe openings, in said heat barrier and rubber-like compounds and said second brake shoe, the openings in said second brake shoe being adapted to tightly fit the shoe mounting pins to retain the assembly in a disc brake caliper, eliminating a noise path from the lining pad through the first shoe and mounting pins to the caliper.

2. A disc brake lining noise suppression system including a brake shoe and lining assembly comprising:
   a first assembly section defined by a first brake shoe, a brake lining pad and a heat barrier secured together;
   a second assembly section including a second brake shoe;
   a rubber-like compound attached to and joining said first and second assembly sections and allowing said first assembly section to vibrate laterally and longitudinally relative to said second assembly section during brake application;
   and mounting means mounting said shoe and lining assembly in a disc brake caliper and retaining said second assembly section against lateral and longitudinal vibration relative to the disc brake caliper while permitting lateral and longitudinal vibration of said first assembly section.

* * * * *